US005774109A

United States Patent [19]
Winksy et al.

[11] Patent Number: 5,774,109
[45] Date of Patent: Jun. 30, 1998

[54] ELECTRONIC SCROLLING BOOK WITH TEMPORARY INTERRUPTIONS

[75] Inventors: Gregory J. Winksy, Medford; Morton Edward David, Montclair, both of N.J.; James H. Simons, New York, N.Y.

[73] Assignee: Franklin Electronic Publishers, Incorporated, Burlington, N.J.

[21] Appl. No.: 580,874

[22] Filed: Dec. 29, 1995

[51] Int. Cl.[6] .................................................. G06F 3/00
[52] U.S. Cl. .................. 345/124; 345/169; 345/901; 395/341; 395/603; 395/615; 395/762; 395/806; 395/347; 395/968
[58] Field of Search .................................. 395/326–358, 395/603, 615, 806, 968, 762, 173; 434/317; 345/123–125, 901, 169

[56] References Cited

U.S. PATENT DOCUMENTS

| | | | |
|---|---|---|---|
| 4,159,417 | 6/1979 | Rubincam | 345/901 X |
| 4,160,242 | 7/1979 | Fowler et al. | 345/901 X |
| 5,007,019 | 4/1991 | Squillante et al. . | |
| 5,038,138 | 8/1991 | Akiyama et al. | 345/123 |
| 5,075,673 | 12/1991 | Yanker | 345/123 |
| 5,122,785 | 6/1992 | Cooper | 345/123 X |
| 5,153,831 | 10/1992 | Yianilos . | |
| 5,196,838 | 3/1993 | Meier et al. | 345/118 |
| 5,295,070 | 3/1994 | Justice . | |
| 5,321,609 | 6/1994 | Yianilos et al. . | |
| 5,339,091 | 8/1994 | Yamazaki et al. | 345/901 X |
| 5,418,549 | 5/1995 | Anderson et al. | 345/123 X |
| 5,467,102 | 11/1995 | Kuno et al. | 345/901 X |
| 5,475,399 | 12/1995 | Borsuk | 395/901 X |
| 5,485,174 | 1/1996 | Henshaw et al. | 345/123 |
| 5,495,566 | 2/1996 | Kwatinetz | 345/123 X |
| 5,524,201 | 6/1996 | Shwarts et al. | 395/326 |

Primary Examiner—John E. Breene
Attorney, Agent, or Firm—McAulay Fisher Nissen Goldberg & Kiel, LLP

[57] ABSTRACT

A hand held electronic book machine has a platform with a keyboard and a display for displaying text. The book machine further includes a database mounted to the platform. The database has a first memory portion storing text of a prose work and a second memory portion storing predetermined information relevant to the prose work. The database may be permanently mounted to the platform or, more preferably, removably mounted to the platform for enabling the use of the platform with different databases storing text and ancillary information for different prose works. The book machine also comprises an electronic scrolling mechanism operatively connected to the first memory portion of the database and to the display for scrolling the text on the display. Operator actuated selection componentry is operatively connected to the second memory portion of the database and to the display for permitting operator selection of portions of the predetermined information to be displayed on the display. A delay is operatively connected to the scrolling mechanism and to the operator actuated selection componentry for temporarily interrupting the scrolling, and display, of the text during display of a selected portion of the predetermined information. The predetermined information may include at least one of glossary entries for selected words in the text, summaries of different portions of the text, and resumés of characters in the text.

53 Claims, 9 Drawing Sheets

FIG.4A of the ship, passed steadily through the long gloom between the high bulwarks

54  48

FIG.4B through the long gloom between [REFERENCE] bulwarks ~~swept over~~ the 58  50

FIG.4C

𝔹𝕌𝕃𝕎𝔸ℝ𝕂𝕊 : the side of a ship above the upper deck

52

FIG.5A to drive it into reluctant minds, through the bulwarks of fear, of 68  62

FIG.5B got his ~~idea he had~~ to drive it into r[REFERENCE]ds, through ~~the bulwarks~~ of 70  64

FIG.5C

𝔹𝕌𝕃𝕎𝔸ℝ𝕂𝕊 : a wall-like structure built for defense; rampart.

66

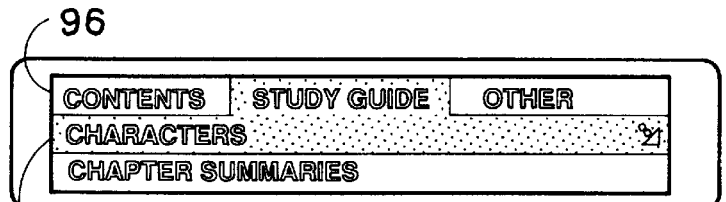
FIG.8A
FIG.8B
FIG.8C
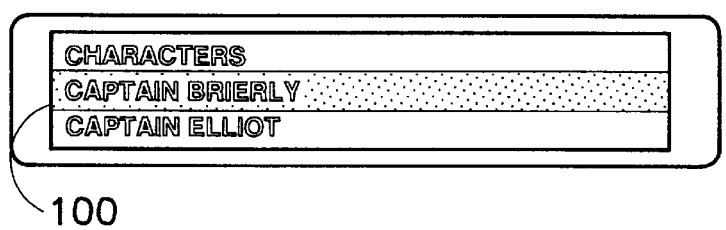
FIG.9A
FIG.9B
FIG.9C
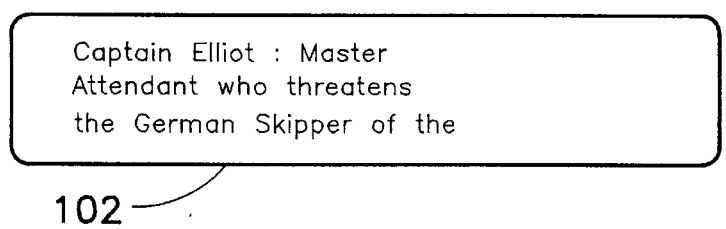

FRAME 1 FRAME 2
FRAME 3 FRAME 4
FRAME 5 FRAME 6
FRAME 7 FRAME 8
FRAME 9 FRAME 10
FRAME 11 FRAME 12
FRAME 13 FRAME 14
FRAME 15 FRAME 16
FRAME 17 FRAME 18

FIG.13A

FRAME 19
FRAME 20
FRAME 21
FRAME 22
FRAME 23
FRAME 24
FRAME 25
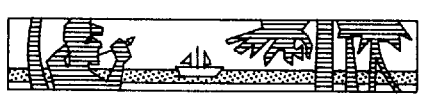
FRAME 26
FRAME 27
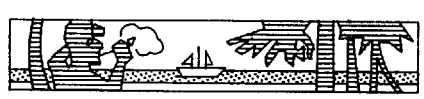
FRAME 28
FRAME 29
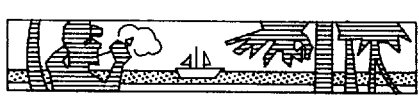
FRAME 30
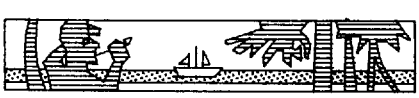
FRAME 31
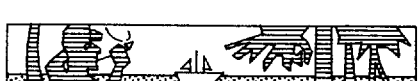
FRAME 32
FRAME 33
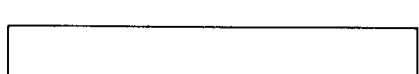
FRAME 34
FIG.13B

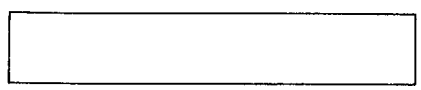
FRAME 35
FRAME 36
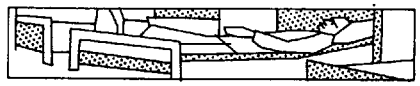
FRAME 37
FRAME 38
FRAME 39
FRAME 40
FRAME 41
FRAME 42
FRAME 43
FRAME 44
FRAME 45
FRAME 46
FRAME 47
FRAME 48
FRAME 49
FRAME 50
FRAME 51
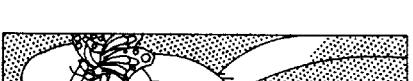
FRAME 52
FRAME 53
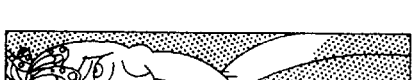
FRAME 54
FIG. 13C

ELECTRONIC SCROLLING BOOK WITH TEMPORARY INTERRUPTIONS

BACKGROUND OF THE INVENTION

This invention relates to a hand held book machine and to an associated method for operating such a machine.

Hand held electronic machines are known for accessing information stored in digitally encoded form on ROM chips. For example, U.S. Pat. No. 5,321,609 discloses a hand held electronic encyclopedia comprising a platform or frame member carrying a keyboard for enabling user-controlled access to the stored information and a screen for displaying the accessed or selected portion of the information. U.S. Pat. No. 5,295,070 describes an electronic dual language dictionary, whereas U.S. Pat. No. 5,007,019 discloses an electronic thesaurus. From these references, it is understood techniques for rapid scanning or searching of an electronic database against a selected word or set of words are well known.

The accessing of a reference work such as an encyclopedia or a thesaurus is generally a random procedure. To provide an electronic machine for reading a prose work involves different considerations inasmuch as a prose work, whether a novel, biography, play, etc., is read from beginning to end rather than sporadically and randomly.

SUMMARY OF THE INVENTION

The present invention seeks to solve the problem of providing an electronic book machine suitable for the presentation and reading of a prose work.

A hand held electronic book machine in accordance with the present invention has a platform with a keyboard and a display for displaying text. The book machine further comprises a database mounted to the platform. The database has a first memory portion storing text of a prose work and a second memory portion storing predetermined information relevant to the prose work. The database may be permanently mounted to the platform or, more preferably, removably mounted to the platform for enabling the use of the platform with different databases storing text and ancillary information for different prose works. The book machine also comprises an electronic scrolling mechanism operatively connected to the first memory portion of the database and to the display for scrolling the text on the display. Operator actuated selection componentry is operatively connected to the second memory portion of the database and to the display for permitting operator selection of portions of the predetermined information to be displayed on the display. A delay is operatively connected to the scrolling mechanism and to the operator actuated selection componentry for temporarily interrupting the scrolling, and display, of the text during display of a selected portion of the predetermined information. The predetermined information may include at least one of (1) glossary entries for selected words in the text, (2) summaries of different portions of the text, and (3) resumés of characters in the text.

Pursuant to a specific embodiment of the present invention, the book machine further comprises an operator actuated scroll adjustment element operatively connected to the scrolling mechanism for adjusting a rate of scroll of the text on the display. Preferably, the scrolling mechanism includes a pause feature for temporarily and automatically halting the scrolling of the text on the display in response to markers contained in the text. The pause feature may specifically function to provide pauses of different durations in response to different kinds of the markers such as commas, periods and paragraph changes. For example, upon the appearance of a comma, period or paragraph change in the last line on the display, further display of alphanumeric characters and concomitantly the further scrolling of lines of text on the screen or display is delayed for predetermined time intervals depending on the kind of the punctuation mark. It is to be noted that a normal function of punctuation marks may be performed by these pauses or delays in the presentation of text on the display of the book machine. Accordingly, in some applications, the display of punctuation marks may be omitted, although the text will necessarily include markers for enabling the book machine to identify the places where pauses are to occur and the durations of the pauses.

As pointed out above, an electronic book machine in accordance with the present invention may display glossary entries for selected terms in the text. Thus, the predetermined information in the second memory portion includes glossary entries for selected words in the text, while the operator actuated selection componentry enables selection, from the second memory portion, of a glossary entry to be displayed on the display. The delay provides the temporary interrupt during display of a selected glossary entry.

According to a particular realization of the glossary, at least some of the selected words are each provided in the second memory portion with a plurality of glossary entries which differ according to position of the respective selected word in the text. The book machine then further comprises circuits and software responsive to the operator actuated glossary term selection componentry for selecting a glossary entry from the second memory portion in accordance with textual position. Thus, in many applications, the glossary entry which is selected for a word or term corresponds to the way the term is used in context.

In accordance with an alternative or an additional feature of the book machine, the database stores summaries of different portions of the text. In that case, the book machine further comprises operator actuated summary selection componentry operatively connected to the database and to the display for selecting, from the database, a summary to be displayed on the display. In a specific implementation of the summary feature, the summary selection componentry may include circuitry and programming for automatically determining a portion of text currently displayed and for automatically selecting a summary of a portion of text preceding the displayed text. Where the prose work has chapters, the summaries may include chapter summaries of chapters of the text. The summary selection componentry serves to automatically select a chapter immediately preceding the chapter being viewed on the display or, alternatively, to display any summary in response to a user selection. In any event, the summary selection componentry selectively displays the chapter summaries at any point in a presentation of the text on the display.

Where the prose work includes characters, the database may store, for each of a multiplicity of characters, one or more resumés. The selection componentry includes operator actuated character selection componentry for selecting a resumé of a character and for displaying the selected resumé on the display. A plurality of resumés are necessary, for example, to provide character descriptions in the middle of the prose work, without revealing subsequent developments in plot or characterization. Where the database stores a plurality of resumés for each of the characters, each resumé is associated with a respective portion of the text, while the character selection componentry is operatively connected to the scrolling mechanism and the display for choosing a character at a place in the text, for selecting a resumé of the chosen character in accordance with the place in the text, and for displaying the selected resumé on the display.

The database may also store a standard reference work in electronically encoded form. In that case, operator actuated reference work access componentry is operatively connected to the database and to the display for selecting part of the reference work to be displayed on the display in place of the text. The book machine then also includes reaccess elements for redisplaying the text upon a cancellation of the part of the reference work from the display.

Pursuant to another feature of the present invention, the electronic book machine further comprises a character identification component which may take the form of a generic microprocessor circuit as modified by programming, the circuit being operatively connected to the display for identifying a character speaking dialogue in a part of the text on the display and for providing, on the display, an identification of the identified character. The character identification may take the form of an icon in a corner of the display.

The operator actuated selection componentry advantageously includes elements for automatically selecting, in response to an actuation of the selection componentry by an operator, a first term in text on the display for which there is an entry in the second memory portion and displaying the entry for the first term. Thus, upon the actuation of a button designated "DEF" (definitions), the selection componentry of the book machine scans volatile memory contents holding the displayed text in encoded form and determines the first word or phrase in the displayed text which has a glossary entry. That glossary entry is then displayed on the screen of the book machine for a predetermined period (when scrolling is automatic) or delay or until "DEF" or another button is actuated (manual scrolling). At that time, the text is returned to the display screen. Where the glossary entry is long, the glossary entry itself is scrolled on the display. After a predetermined interval following the arrival of the last line of glossary text on the display, the main text is returned to the display.

Similarly, upon an actuation of a key labeled "CHAR" (character), the selection componentry scans volatile memory contents corresponding to the displayed text and determines the first character name in the displayed text which has a resumé entry. That resumé entry is then displayed on the screen of the book machine for a predetermined period or delay or until "CHAR" or another key is pressed. At that time, the text is returned to the display screen. Where the prose work is a novel, the book machine best displays a character resumé which corresponds only to text already read. Thus, the reader is exposed to no more about the character than has already been disclosed. Where the prose work is non-fiction, it is more appropriate in many cases for the characters to have only one resumé apiece.

The operator actuated selection componentry also advantageously includes elements for enabling an operator to select a portion of the predetermined information relevant to a term at any position in text on the display. Thus, using directional keys, an operator may move a cursor to any word in the text to call up a glossary term or character resumé for that term.

Alternatively or additionally, the operator actuated selection componentry includes menu programming elements for enabling an operator to select any portion of the predetermined information in the second memory portion for display. Accordingly, from one menu, an operator may select "glossary" from a list including "glossary," "characters,"
and "summaries." From a subsequently displayed menu listing entries in the glossary, the operator selects a desired term for explication. Selection may be accomplished via directional keys and an "enter" key.

In accordance with another feature of the present invention, the book machine further comprises a user operated component operatively connected to the scrolling mechanism for storing an electronic bookmark marker to enable a return of a user to a desired location in the text. It is to be noted that the bookmark feature of the present invention has previously appeared in other hand held electronic references machines.

In certain applications, the database advantageously has a third memory portion (e.g., part of the first or second memory portion) storing a graphic representation or animation. In that case, the book machine further comprises an animation control operatively connected to third memory portion of the database and the display for displaying the graphic representation or animation on the display. The text may be provided with an icon marking a place for display of the graphic representation or animation, whereas user operated animation selection componentry is operatively connected to the scrolling mechanism for selecting an animation sequence from an icon in text on the display; the animation control being operatively connected to the animation selection componentry for displaying the graphic representation or animation on the display in response to a selection made by a user via the animation selection componentry.

The book machine may include programmed circuits operatively connected to the scrolling mechanism and to the display for providing the operator with a progress gauge on the display to indicate a location of text on the display relative to the entire text of the prose work. The reader may use the gauge to ascertain his or her progress in completing a perusal of the prose work. The gauge may identify a chapter shown on the display and indicate the number of remaining chapters in the prose work and may specifically take the form of a variable-length bar.

Advantageously, the book machine is provided with an operator actuated prior screen return button operatively connected to the scrolling mechanism and the display for interrupting the scrolling of text on the display, showing text of a prior screen on the display and continuing scrolling of the text beginning with the prior screen.

The present invention is also directed to an associated method for operating a hand held electronic book machine having a platform with a keyboard and a display for displaying text. The method utilizes a database operatively connected to the platform and storing text of the prose work in a first memory portion and predetermined information in a second memory portion. The method comprises accessing the first memory portion, then automatically scrolling the text on the display, subsequently accessing the second memory portion of the database to select a portion of the predetermined information, and then displaying the selected portion of the predetermined information on the display. During display of the selected portion of the predetermined information, the scrolling of the text, and thus the display thereof, is temporarily interrupted. As discussed above, the predetermined information stored in the second memory portion of the database includes at least one of (1) glossary entries for selected words in the text, (2) summaries of different portions of the text, and (3) resumés of characters in the text.

Where the database includes an additional memory portion (either separate or part of the second memory portion)

storing a standard reference work in electronically encoded form, the method further comprises selecting, from the additional memory portion, part of the reference work to be displayed on the display in place of the text, temporarily interrupting the scrolling of the text, and displaying the selected part of the reference work on the display during the scrolling interruption.

The method also comprises, in some applications, the step of storing an electronic bookmark marker to enable a return of a user to a desired location in the text.

Where the database has an additional memory portion storing a graphic representation or animation, the method further comprises the steps of displaying the graphic representation or animation on the display; and temporarily interrupting the scrolling of the text during display of the graphic representation or animation. Where the text is provided with an icon marking a place for display of the graphic representation or animation, the icon is selected from text on the display, whereupon the graphic representation or animation is displayed.

As discussed above, a progress gauge indicating a location of text on the display relative to the entire text of the prose work may be provided on the display, for example, in response to user selection or activation via a menu. The progress gauge may include a chapter identification and a number of remaining chapters in the prose work. Alternatively, or additionally, the progress gauge is a variable-length bar.

The method may additionally comprise the steps of interrupting the scrolling of text on the display in response to a pressing of a key on the platform, showing text of a prior screen on the display and continuing scrolling of the text beginning with the prior screen.

In one procedure in accordance with the present invention, the selection of the portion of the predetermined information includes automatically selecting a first term in text on the display for which there is an entry in the second memory portion and displaying the entry for the first term. Alternatively, the predetermined information may be accessed relative to a term at any position in text on the display. This procedure may be implemented, for example, through the utilization of directional keys on the keyboard. In yet another alternative procedure, selection from the predetermined information on store in the second memory portion of the database is accomplished via an electronic menu.

Pursuant to another feature of the present invention, the text is automatically scrolled on the display at a selectable rate. The rate of scroll is adjusted in response to user input, whereupon the text is automatically scrolled on the display at the new rate. Also, the scrolling of the text may be automatically and temporarily halted in response to markers contained in the text. More specifically, pauses of different durations may be provided in response to different kinds of the markers, the kinds of the markers including commas, periods and paragraph changes.

BRIEF DESCRIPTION OF THE DRAWINGS

FIGS. 4A–4C illustrate successive display screens in a glossary entry selection and display sequence in an electronic book machine method in accordance with the present invention.

FIGS. 5A–5C show successive display screens in another glossary entry selection and display sequence in an electronic book machine method in accordance with the present invention. FIGS. 4A–4C and 5A–5C together depict the accessing of context sensitive glossary entries, in accordance with the present invention.

FIGS. 8A–8C show successive display screens in a menu driven character resumé selection and display sequence in an electronic book machine method in accordance with the present invention.

FIGS. 9A–9C illustrate successive display screens in a chapter summary selection and display sequence in an electronic book machine method in accordance with the present invention.

FIGS. 13A–13C together show a sequence of frames or display screens in an animation sequence in an electronic book machine in accordance with the present invention.

DETAILED DESCRIPTION

Figure 1:
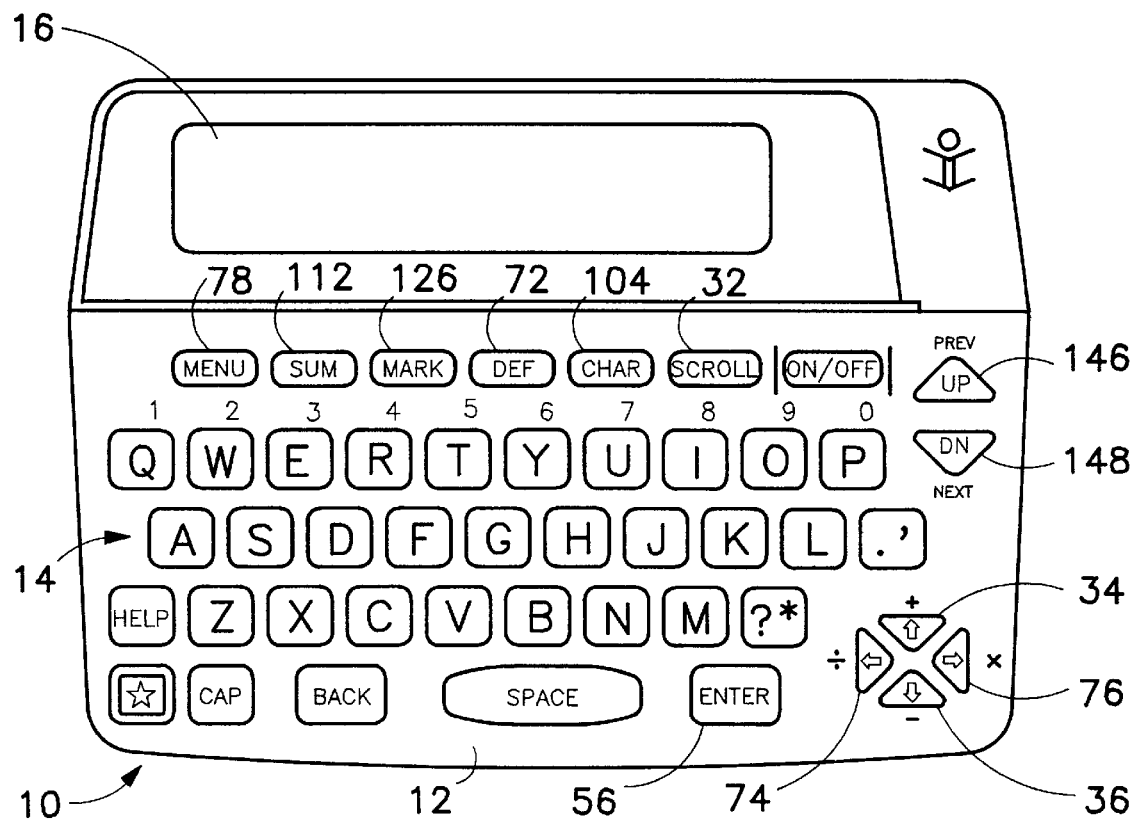
FIG. 1 is a plan view of a platform with a keyboard and a display, for an electronic book machine in accordance with the present invention.

As shown in FIG. 1, an electronic book machine 10 according to this invention includes a platform, frame member or casing 12 which can be held by hand and which carries a keyboard 14 and a display screen 16. The platform 12 is provided with a slot (not shown) receiving a card 18 (FIG. 2) which carries a database 20 (FIG. 3).

Figure 3:
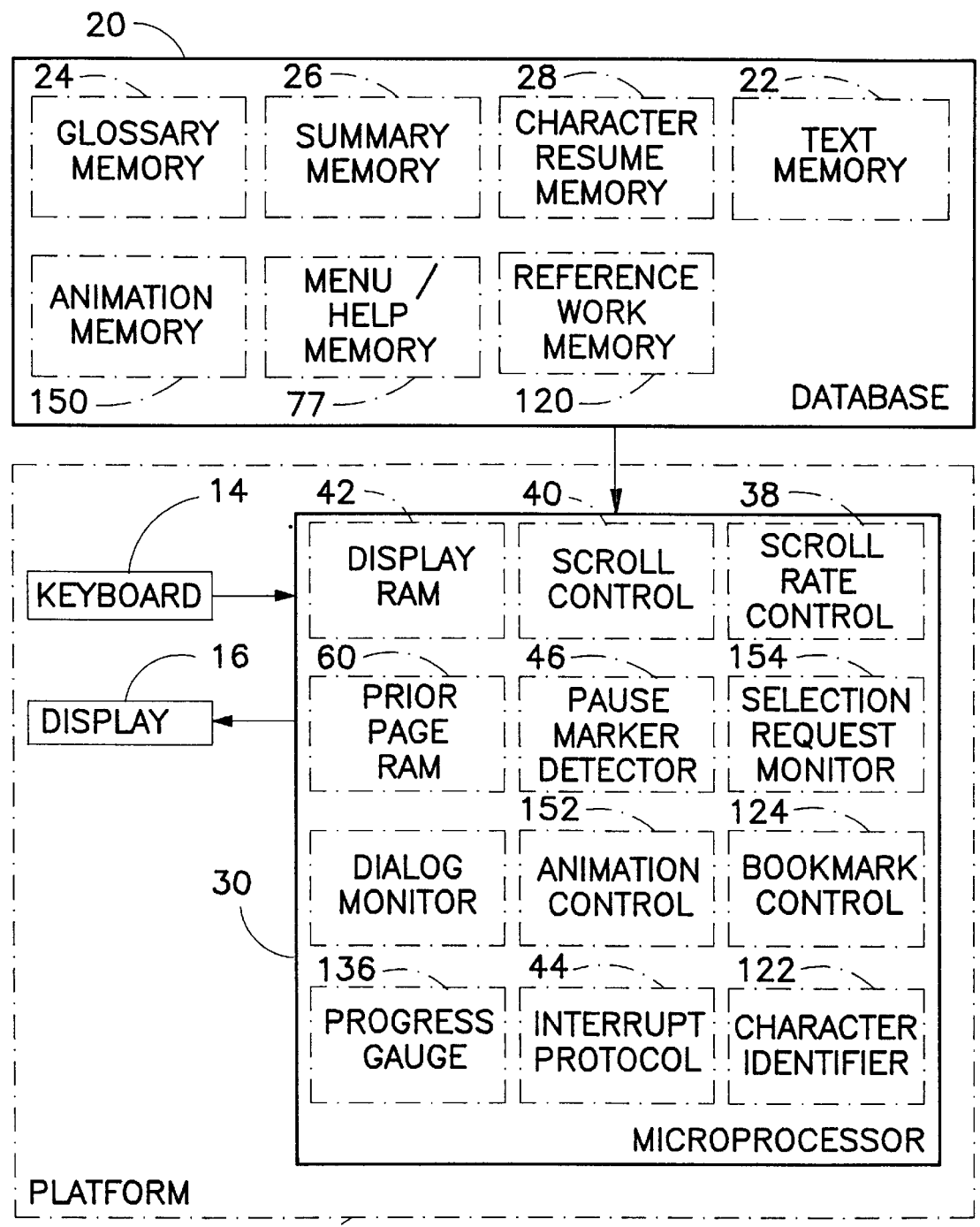
FIG. 3 is a block diagram showing programmed functional elements of an electronic book machine in accordance with the present invention.

As illustrated in FIG. 3, database 20 has a first memory portion 22 storing text of a prose work such as the novel Lord Jim and further memory portions 24, 26, and 28 storing predetermined information relevant to the prose work. More particularly, memory portion 24 stores glossary entries for selected words in the text, memory portion 26 stores summaries of different portions of the text, and memory portion 28 stores resumés of characters in the text.

Database 20 is removably mounted to platform 12 for enabling the use of platform 12 with different databases storing text and ancillary information for different prose works. Platform 12 carries a microprocessor 30 which implements an electronic scrolling function. More specifically, microprocessor 30 accesses memory portion 22 of database 20 to determine text for display on screen 16 at a given scroll rate. The operator of the book machine 10 may modify the scroll rate via keyboard 14. Upon the pressing of a scroll key 32 (FIG. 1) by the operator, microprocessor 30 awaits further input, for example, actuation of an "up" or a "down" directional key 34 or 36, indicating an instruction from the operator to increase or decrease the scroll rate. Between a preset minimum and a preset maximum, the scroll rate may be changed in increments or steps in accordance with the number of actuations of the "up" or "down" directional key 34 or 36 or in accordance with the time that the respective key is pressed. As illustrated in FIG. 3, microprocessor 30 includes a scroll rate control module 38 for determining, setting and controlling the rate of scroll of text. Microprocessor 30 includes a scroll control module 40 which operates to determine the textual matter from database memory portion 22 to be displayed and feeds the text, in encoded form, to a display RAM 42.

It is understood, of course, that modules 38 and 40, as well as other modules of microprocessor 30 discussed below, are implemented by microprocessor circuits as modified by programming. The programming is, for those functions peculiar to the particular prose work, permanently stored in database 22 and may be transferred to RAM in microprocessor 30 for purposes of implementing the book functions disclosed herein. Alternatively, microprocessor 30 may directly access ROM on card 18 and follow the programming therein without intermediate transfer to a RAM on platform 12. In any event, the programming in database 20 largely and perhaps most significantly determines the programmed structure of microprocessor 30 and the operation thereof Exchanging a card 18 on platform 12 for another card carrying a different main text and different ancillary information essentially generates a new machine.

An operator actuates an appropriate sequence of keys of keyboard 14 to select, from contents of memory 24, 26 or 28 of database 20, desired ancillary information for display on screen 16. In response to signals from keyboard 14, an interrupt protocol module 44 of microprocessor 30 cooperates with scroll control 40 to institute a delay or temporary interruption in further display and scrolling of text from memory 22 on screen 16 during display of information selected from memory 24, 26 or 28.

Microprocessor 30 further includes a pause marker detection module 46 which cofunctions with scroll control 40 to temporarily and automatically halt the scrolling of text on display screen 16 in response to markers contained in the text. More specifically, upon the detection of a pause marker by module 46, scroll control 40 inserts a pause in the display of text on screen 16. The duration of the pause in a display process varies in accordance with the kind of marker. A comma results in a pause or shorter duration than a period, which in turn results in a pause of shorter duration than a paragraph change. Of course, markers other than punctuation marks may be inserted in the text and durations may vary, depending, for instance, on the length of a prior clause, sentence or paragraph.

A pause is inserted by scroll control 40 upon the appearance of a comma, period or paragraph change in the last line on display screen 16. Further display of alphanumeric characters and concomitantly further scrolling of lines of text on screen 16 is delayed for predetermined time intervals depending on the kind of the punctuation mark. In some applications, the display of punctuation marks may be omitted, although the text will necessarily include markers for enabling the book machine to identify the places where pauses are to occur and the durations of the pauses.

FIGS. 4A–C illustrate successive display screens 48, 50 and 52 in a glossary entry selection and display sequence. Any word which has an entry in the glossary may be automatically highlighted, as indicated at 54, in accordance with data stored in memory 22, upon actuation of an Enter function key 56 or a key 72 labeled "DEF." Where there are two or more terms in text on display 16 which have entries in glossary memory portion 24 or character resumé memory 28, microprocessor 30 operates to highlight the first such term appearing on display 16. If the user desires a glossary entry or character resumé for a subsequent term on the display, he or she may use directional keys 34, 36, 74, 76 to move the highlight to the desired term. To select the glossary entry for the highlighted word 54, the operator actuates the Enter function key 56 (FIG. 1). In response, microprocessor 30 inserts an indicator 58, such as the word "Reference" in a box (FIG. 4B), in the text displayed on screen 16, thus confirming that a glossary entry has been requested. Subsequently, upon retrieval of the selected glossary entry from memory 24 (FIG. 3), the entry is produced on display screen 16, as shown in FIG. 4C. As discussed above, interrupt protocol module 44 (FIG. 3) cofunctions with scroll control 40 to delay or temporarily interrupt further display and scrolling of the text of the prose work during display of the selected glossary entry. Screen 48 (FIG. 4A) may be stored in a "prior page" RAM 60 of microprocessor 30 during display of the selected glossary screen 52. Alternatively, microprocessor 30 stores, in RAM 60, a code identifying the text portion on display 16 at the time of the interrupt. This alternative may be followed whenever text on display 16 is temporarily removed for display of ancillary information.

It is to be noted that there will be alternative term selection procedures within the contemplation of the instant invention. For example, instead of highlighting, microprocessor 30 may display a letter "D" next to a term with an ancillary information entry in database 20. The "D" may be selected via Entry function key 56 to access desired ancillary information.

It is frequently the case that the same word or term will have different meanings in a prose work, depending on context. Accordingly, glossary memory 24 may store, for the same term, a plurality of entries which are associated with respective textual positions in the prose work stored in encoded form in memory 22. As shown in FIGS. 4A and 5A, the word "bulwarks" may have a literal meaning and a metaphorical meaning. Successive screens 62, 64 and 66 shown in FIGS. 5A–5C, respectively, show stages in the retrieval of the appropriate glossary entry for the metaphorical use of "bulwarks," in context. As discussed above, the term is highlighted at 68 and an indicator 70 appears upon pressing of Enter function key 56.

When two or more terms are highlighted on display screen 16, microprocessor 30 displays the glossary (or character) entry for the first highlighted term in response to an actuation of the Enter function key 56. Upon the actuation of a "DEF" key 72 (FIG. 1), microprocessor 30 operates to scan the contents of RAM 42 so as to determine the first word or phrase in displayed text which is highlighted. A displayed glossary entry may remain on screen 16 for a predetermined period or delay (when scrolling is automatic), determined by interrupt protocol module 44, or until "DEF" key 72 or another button is actuated (in manual scrolling). At that time, the text stored in RAM 60 is returned to RAM 42 for display on screen 16. Where the glossary entry is scrolled on display screen 16, the main text returned to display screen 16 after a predetermined interval following the arrival of the last line of glossary text on display screen 16.

In an alternative memory accessing procedure, the operator actuates key 72. In response to that actuation of key 72, microprocessor 30 awaits the pressing of directional keys 34, 36, 74 and 76 and moves a cursor (e.g., a highlighting) to a term on the display screen selected by the operator. Upon a subsequent actuation of Enter function key 56, microprocessor 30 accesses memory 24 (or 28) for a glossary (or character resumé) entry corresponding to the selected term.

Figure 6A:
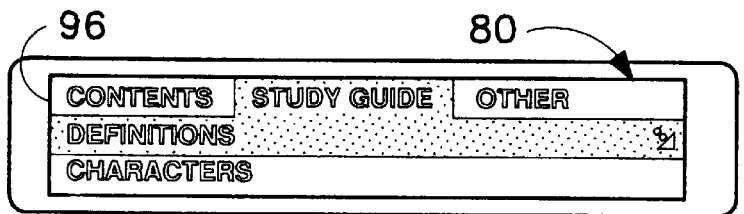
FIGS. 6A–6C illustrate successive display screens in a menu driven glossary entry selection and display sequence in an electronic book machine method in accordance with the present invention.
Figure 6B:
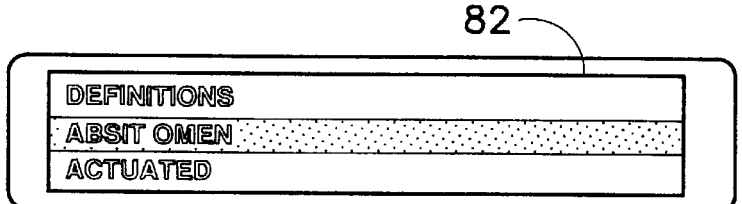
Figure 6C:
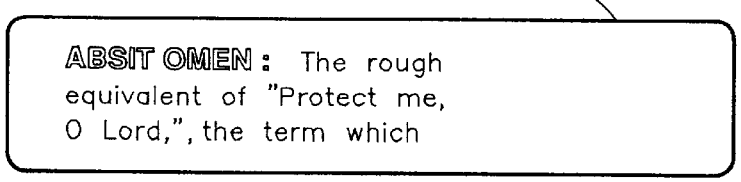

In another procedure for accessing database 20 for ancillary information, an operator presses a menu button 78 (FIG. 1) which brings a menu 80 to display screen 16, as illustrated in FIG. 6A. The operator uses directional keys 34, 36, 74, 76 and the Enter function key 56 to select ancillary information from a menu/help memory 77 of database 20 for display on screen 16. After using "left" and "right" directional keys 74 and 76 to select "Study Guide" from a main menu 96 (FIG. 6A), the operator utilizes up and down directional keys 34 and 36 to select "Definitions" from among choices including "Definitions," "Summaries," "Characters," and "Reference." Upon detecting the actuation of Enter function key 56, microprocessor 30 accesses glossary memory 24 to retrieve an encoded list of glossary entries and displays a portion of the list in sequence on screen 16, as illustrated in a display menu 82 in FIG. 6B. Again using the up and down directional keys 34 and 36 and Enter function key 56, the operator selects an entry from the glossary, e.g., "absit omen." The selected entry is then displayed on screen 16, as shown at 84 in FIG. 6C. Where a selected glossary entry cannot be shown on display screen 16 at once, scroll control module 40 operates to scroll the glossary entry across display screen 16.

Figure 7A:
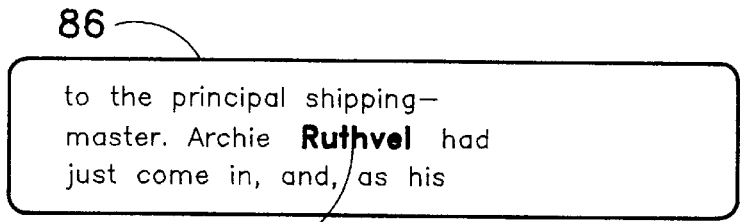
FIGS. 7A–7C depict successive display screens in a character resumé selection and display sequence in an electronic book machine method in accordance with the present invention.
Figure 7B:
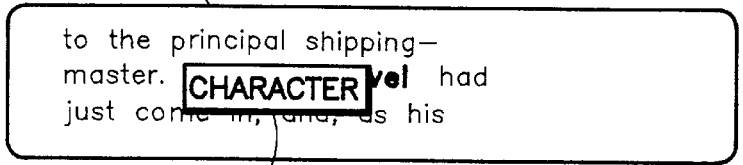
Figure 7C:
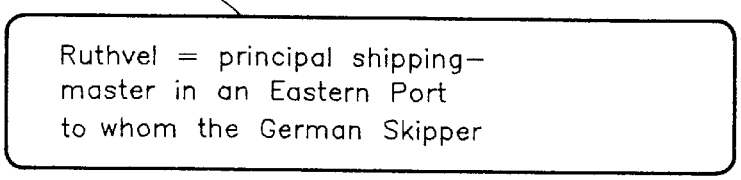

FIGS. 7A–7C depict successive display screens 86, 88 and 90 in a character resumé selection and display sequence. Screen 86 shows a character name highlighted at 92. As discussed above, a character name is highlighted upon the pressing of Enter function key 56, if the name is the first term on display screen 16 with an entry in database 20. If it is not the first entry, it may be selected by using directional keys 34, 36, 74, 76. Upon a subsequent actuation of Enter function key 56, microprocessor 30 inserts an indicator 94, such as the word "Character" in a box (FIG. 7B), in the text displayed on screen 16, thus confirming that a character resumé has been requested. Subsequently, upon retrieval of the selected character resumé from memory 28 (FIG. 3), the resumé is produced on display screen 16, as shown in screen 90 of FIG. 7C. Again, interrupt protocol module 44 (FIG. 3) cofunctions with scroll control 40 to delay or temporarily interrupt further display and scrolling of the text of the prose work during display of the selected character resumé. Screen 86 (FIG. 7A) or an identification code therefor may be stored in "prior page" RAM 60 of microprocessor 30 during display of the selected character resumé screen 90.

In a menu driven procedure for accessing database 20 for character information, an operator presses menu button 78 (FIG. 1) which brings a main menu 96 to display screen 16, as illustrated in FIG. 8A. The operator uses left and right directional keys 74 and 76 to select the study guide submenu 98 from memory 77 (FIG. 3) for display on screen 16. The operator then utilizes up and down directional keys 34 and 36 to select "Characters" from submenu 98. Upon detecting the actuation of Enter function key 56, microprocessor 30 accesses character resumé memory 28 to retrieve an encoded list of characters and displays a portion of the list in sequence on screen 16, as illustrated in a display menu 100 in FIG. 8B. Again using the up and down directional keys 34 and 36 and Enter function key 56, the operator selects an entry from the character list, e.g., "Captain Elliot." The selected entry is then displayed on screen 16, as shown at 102 in FIG. 8C. Where a selected character resumé cannot be shown on display screen 16 at once, scroll control module 40 operates to scroll the glossary entry across display screen 16.

It is to be noted that the character resumés stored in memory portion or area 38 may be context sensitive, i.e., keyed to the location or place in the text at which the selection occurred. Thus, a displayed character resumé can be tailored to disclose only information about the selected character which has been made available in the text up to the place of selection. This function is particularly desirable for prose works which exhibit plot development. If a user wishes to obtain further information about a character, without limitation by context, he or she may access resumé memory 28 via the menu procedure described above. Of course the menu may indicate different resumés associated with different portions of a prose work, e.g., with chapters, enabling an operator to use the menu and avoid unintended glimpses of future developments in the prose work.

FIGS. 9A–9C illustrate successive display screens 106, 108 and 110 in a chapter summary selection. Upon an actuation of a summary function key 112, labeled "SUM" in FIG. 1, microprocessor 30 displays an indicator 114 such as the words "Chapter Summary" in a pop-up box (FIG. 9B) in the text displayed on screen 16, to verify that a summary has been requested. Subsequently, upon retrieval from memory 26 of the summary for the chapter immediately preceding the chapter being perused via display screen 16, the summary is produced on screen 16, as shown in screen 110 of FIG. 9C. As in other information retrieval and display sequences, interrupt protocol module 44 (FIG. 3) cofunctions with scroll control 40 to delay or temporarily interrupt further display and scrolling of the text of the prose work during display of the selected character resumé. Screen 106 (FIG. 9A) or an identification code therefor may be stored in "prior page" RAM 60 of microprocessor 30 during display of the selected summary 110.

Figure 10A:
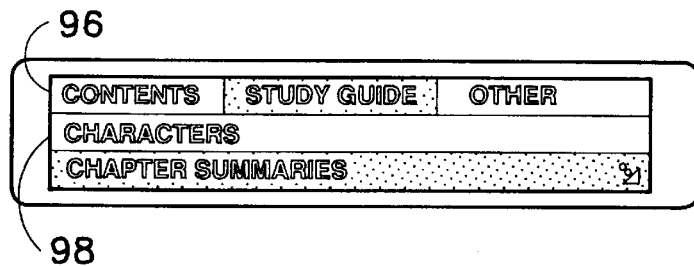
FIGS. 10A–10C depict successive display screens in a menu driven chapter summary selection and display sequence in an electronic book machine method in accordance with the present invention.
Figure 10B:
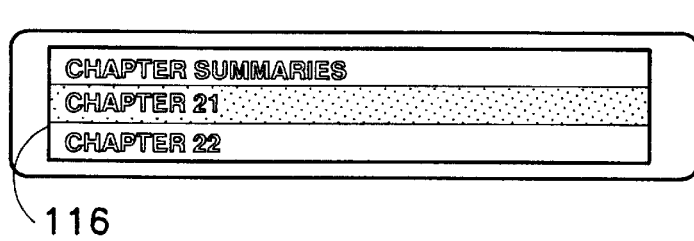
Figure 10C:
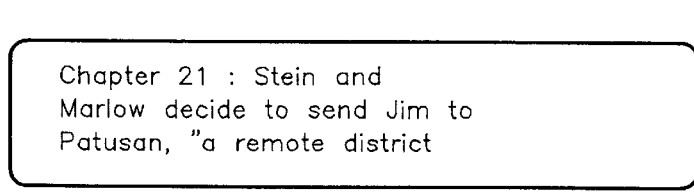

As illustrated in FIGS. 10A–10C, summaries in memory 24 may be access via menus. Menu button 78 (FIG. 1) is actuated to call up main menu 96 (FIG. 10A). Upon a highlighting of "study Guide" in response to the actuation of left and right directional keys 74 and 76, microprocessor 30 displays submenu 98 (FIG. 10A). The operator then uses up and down directional keys 34 and 36 and Enter function key 56 to select "Chapter Summaries." Microprocessor 30 then displays a list 116 of summaries stored in memory portion 24. The memories are of different portions of text, for example, chapters, as indicated in FIG. 10B. The selected summary is displayed, as shown in a screen 118 in FIG. 10C. Where a selected summary cannot be shown on display screen 16 at once, scroll control module 40 operates to scroll the summary across display screen 16.

Database 20 also stores a standard reference work in electronically encoded form in a memory portion 120 of database 20 (FIG. 3). An operator can obtain access to a desired segment of the reference work via the menu procedure. In that case, submenu 98 (FIGS. 8A and 10A) lists the reference work for selection via directional keys 34, 36, 74, 76 and Enter function key 56. The reference work may also be accessed by pressing Enter function key 56, and selecting a desired term via directional keys 34, 36, 74, 76 and key 56. In the event that a selected term has entries in two or more areas of memory in database 20, microprocessor 30 displays a "disambiguation" menu which permits selection of desired ancillary information by the user. Prior to the display of a selected part of the reference work, microprocessor 30 may store the current screen of text (or an identification code therefor) in RAM 60 and operate interrupt protocol module 44 to reaccess or redisplay the text upon a cancellation of the part of the reference work from display screen 16.

As illustrated in FIG. 3, microprocessor 30 may optionally include a character identification module 122 in the form of generic circuitry modified by programming from database 20, e.g., by encoded markers embedded in the text of the prose work. Character identification module 122 determines which character of the prose work is speaking dialogue shown on display screen 16 and provides, on display screen 16, an identification of the speaker. The speaker identification may take the form of an icon in a corner of display screen 16. The icon may be, for example, a letter of the alphabet or a graphic representation of an item peculiar to the trade or profession of the particular character (e.g., a cleaver for a butcher, a feather pen for a scrivener, scales of justice for an attorney or judge, stethoscope for a doctor, etc.).

As additionally depicted in FIG. 3, microprocessor 30 may also optionally incorporate a bookmark control module 124 in operative communication with scroll control module 40 and display RAM 42 for storing an electronic bookmark marker to enable a return of a user to a desired location in the text. Upon an actuation of a keyboard button 126 labeled "MARK" (FIG. 1), bookmark control module 124 determines the position of the matter on display screen 16 with respect to the entire text of the prose work and memorizes that position for enabling a subsequent resumption of the desired display. The encoded bookmark marker may be stored in RAM by microprocessor 30. In some applications card 18 (FIG. 2) may be provided with a power source and a RAM (neither illustrated) to enable storage of the bookmark marker on the card.

Figure 12:
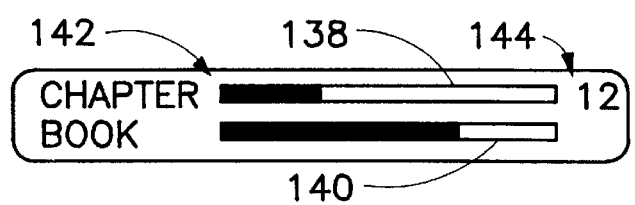
FIG. 12 shows a display screen with a progress gauge in accordance with the present invention.
Figure 11A:
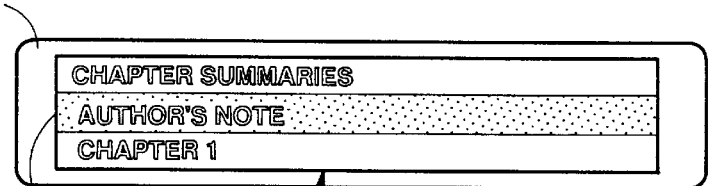
FIGS. 11A and 11B illustrate further menu display screens possible in using an electronic book machine in accordance with the present invention.
Figure 11B:
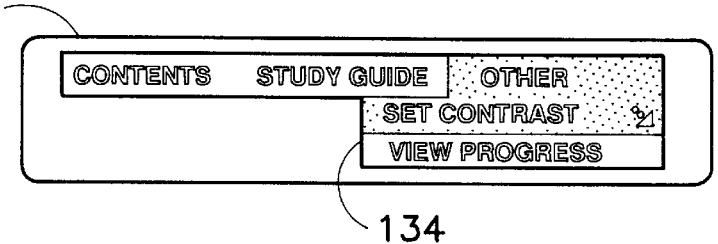

As shown in a display submenu 130 in FIG. 11A, the summaries stored in memory 26 may include summaries of ancillary parts of the prose work such as author's notes (at 132), prefaces, forewords, afterwords, etc. As indicated in a menu 134 in FIG. 11B, other functions of the book machine 10, such as setting screen contrast and providing a progress report or gauge, may be set or selected. Upon selecting the progress gauge, a progress gauge module 136 (FIG. 3) of microprocessor 30 determines the position of displayed text and provides an indicator of the reader's progress. Module 136 is operatively connected to scroll control 40 and display screen 16 (via RAM 42) for identifying text displayed on screen 16, determining the position of that text in the entire prose work, and generating a progress gauge display on screen 16. As shown in FIG. 12, the progress gauge may include a first variable-length bar 138 for indicating the progress of the reader through the current chapter and a second variable-length bar 140 indicating the progress of the reader through the work as a whole. In addition, the progress display 142 may include an identification of the current chapter at 144. Progress display 142 remains for a predetermined period on display screen 16 prior to a redisplay of the main text.

Prior page RAM 60, illustrated in FIG. 3, stores an identification code for the contents of a display screen immediately prior to the screen currently on display 16. An operator actuated prior screen return button or page-up key 146 (FIG. 1) is provided for signaling scroll control module 40 that the scrolling of text on screen 16 is to be interrupted and restarted with the prior screen identified in RAM 60. Then, scrolling of the text continues beginning with the formerly prior screen. A "page down" key 148 (FIG. 1) enables a user to jump ahead by an entire screen, at a faster effective scroll rate.

In certain applications, database 20 advantageously has a memory portion 150 (FIG. 3) which stores one or more graphic representations or animations. Microprocessor 30 concomitantly further includes an animation control module 152 which comprises generic circuitry modified by programming from database 20, and more particularly from memory 150. Module 152 cooperates with scroll control 40, RAM 42, and RAM 60, to display a graphic representation or animation on screen 16. In some applications, the animations are displayed automatically at predetermined positions in the text of the prose work. In such applications, the animations may be stored in memory 22 as sequential screen displays during the presentation of the text. Alternatively, the animations may be called up by the reader, for example, by selecting an icon (not shown) displayed on screen 16 preferably only at predetermined locations in the text. The animations are, in that embodiment, context sensitive. To select an animation icon, the user may utilize directional keys 34, 36, 74, 76. Upon a pressing of the animation key, animation control module 152 may search the text for the first icon on the display (generally only one icon will be displayed at any time on screen 16). The icon is associated with a code specifying the location of an animation sequence in memory 150.

FIGS. 13A–13C together show a sequence of frames or display screens in a sample animation sequence.

Microprocessor 30 may include other modules, as necessary, for executing other routine functions in book operation. For example, a selection request monitor 154 may serve to monitor keyboard 14 for actuation of alphanumeric keys, for example, during input of a glossary selection or a character selection.

Figure 2:
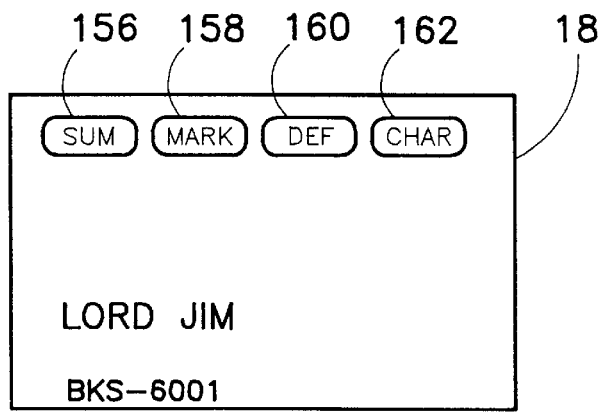
FIG. 2 is a plan view of a database connectable to the platform of FIG. 1, the database electronically storing a prose work for display.

As illustrated in FIG. 2, card 18 may be provided with printed key symbols 156, 158, 160, 162 coded, for example, by color, to indicate which function keys of a generic platform (not shown) are to be actuated to implement the functions indicated by the key symbols 156, 158, 160, 162. Thus, a function key labeled "more" or "quiz" on a generic machine may be actuated to implement the summary or bookmark function described above with reference to keys 112 and 126.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A hand held electronic book machine having a platform with a keyboard and a display for displaying text, comprising:

a database mounted to the platform, said database having a first memory portion storing text of a prose work and a second memory portion storing predetermined information relevant to said prose work;

scrolling means operatively connected to said first memory portion of said database and to the display for scrolling said text on the display;

an operator actuated selection means operatively connected to said second memory portion of said database and to the display for permitting operator selection of portions of said predetermined information to be displayed on the display; and delay means operatively connected to said scrolling means and to said operator actuated selection means for temporarily interrupting the scrolling of said text during display of a selected portion of said predetermined information.

2. The electronic book machine of claim 1 wherein said predetermined information includes at least one of (1) glossary entries for selected words in said text, (2) summaries of different portions of said text, and (3) resumés of characters in said text.

3. The electronic book machine of claim 2, further comprising operator actuated scroll adjustment means operatively connected to said scrolling means for adjusting a rate of scroll of said text on the display.

4. The electronic book machine of claim 3 wherein said scrolling means includes pause means for temporarily and automatically halting the scrolling of said text on said display in response to markers contained in said text.

5. The electronic book machine of claim 4 wherein said pause means includes means for providing pauses of different durations in response to different kinds of said markers, said kinds of said markers including commas, periods and paragraph changes.

6. The electronic book machine of claim 1 wherein:
said predetermined information in said second memory portion includes glossary entries for selected words in said text,
said operator actuated selection means includes means for selecting, from said second memory portion, a glossary entry to be displayed on said display, and
said delay means provides said temporary interrupt during display of a selected glossary entry.

7. The electronic book machine of claim 6 wherein at least some of said selected words are each provided in said second memory portion with a plurality of glossary entries which differ according to position of the respective selected word in said text, further comprising means responsive to said operator actuated glossary term selection means for selecting a glossary entry from said second memory portion in accordance with textual position.

8. The electronic book machine of claim 6 wherein said database has an additional memory portion storing summaries of different portions of said text, further comprising an operator actuated summary selection means operatively connected to said database and to the display for selecting, from said additional memory portion, a summary to be displayed on said display.

9. The electronic book machine of claim 6 wherein said prose work includes characters, said database containing an additional memory portion storing, for a multiplicity of characters, a plurality of resumés, further comprising operator actuated character selection means for selecting a resumé of a character and for displaying the selected resumé on said display.

10. The electronic book machine of claim 6 wherein said database includes a memory area storing a standard reference work in electronically encoded form, further comprising operator actuated reference work access means operatively connected to said database and to the display for selecting, from said memory area, part of said reference work to be displayed on said display in place of said text, also comprising reaccess means for redisplaying said text upon a cancellation of said part of said reference work from said display.

11. The electronic book machine of claim 1 wherein:
said predetermined information in said second memory portion includes summaries of different portions of said text,
said operator actuated selection means includes means for selecting, from said second memory portion, a summary to be displayed on said display, and
said delay means provides said temporary interrupt during display of a selected summary.

12. The electronic book machine of claim 11 wherein said prose work has chapters and said summaries include chapter summaries of chapters of said text, said summary selection means including means for selectively displaying said chapter summaries at any point in a presentation of said text on said display.

13. The electronic book machine of claim 11 wherein said summary selection means includes means for automatically determining a portion of text currently displayed and for automatically selecting a summary of a portion of text immediately preceding the displayed text.

14. The electronic book machine of claim 11 wherein said prose work includes characters, said database containing an additional memory portion storing at least one resumé for each of a multiplicity of characters, further comprising operator actuated character selection means for selecting a resumé of a character and for displaying the selected resumé on said display.

15. The electronic book machine of claim 11 wherein said database includes a memory area storing a standard reference work in electronically encoded form, further comprising operator actuated reference work access means operatively connected to said database and to the display for selecting, from said memory area, part of said reference work to be displayed on said display in place of said text, also comprising reaccess means for redisplaying said text upon a cancellation of said part of said reference work from said display.

16. The electronic book machine of claim 1 wherein:
said predetermined information in said second memory portion includes at least one resumé for each of a multiplicity of characters of said prose work,
said operator actuated selection means includes means for selecting, from said second memory portion, a resumé to be displayed on said display, and
said delay means provides said temporary interrupt during display of a selected character resumé.

17. The electronic book machine of claim 16 wherein said database includes a memory area storing a standard reference work in electronically encoded form, further comprising operator actuated reference work access means operatively connected to said database and to the display for selecting, from said memory area, part of said reference work to be displayed on said display in place of said text, also comprising reaccess means for redisplaying said text upon a cancellation of said part of said reference work from said display.

18. The electronic book machine of claim 16 wherein said second memory portion stores a plurality of resumés for each of said characters, each resumé being associated with a respective portion of said text, said operator actuated character selection means being operatively connected to said scrolling means and the display for choosing a character at a place in said text, selecting a resumé of the chosen character in accordance with the place in said text, and for displaying the selected resumé on the display.

19. The electronic book machine of claim 1, further comprising character identification means operatively connected to said display for identifying a character speaking dialogue in a part of said text on said display and for providing, on said display, an identification of the identified character.

20. The electronic book machine of claim 1 wherein said database includes a memory area storing a standard reference work in electronically encoded form, further comprising operator actuated reference work access means operatively connected to said database and to the display for selecting, from said memory area, part of said reference work to be displayed on said display in place of said text, also comprising reaccess means for redisplaying said text upon a cancellation of said part of said reference work from said display.

21. The electronic book machine of claim 1 wherein said selection means includes means for automatically selecting, in response to an actuation of said selection means by an operator, a first term in text on said display for which there is an entry in said second memory portion and displaying the entry for said first term.

22. The electronic book machine of claim 1 wherein said selection means includes means for enabling an operator to select a portion of said predetermined information relevant to a term at any position in text on said display.

23. The electronic book machine of claim 1 wherein said selection means includes menu means for enabling an operator to select any portion of said predetermined information in said second memory portion for display.

24. The electronic book machine of claim 1 wherein said predetermined information includes a standard reference work in electronically encoded form.

25. The electronic book machine of claim 1, further comprising user operated means operatively connected to said scrolling means for storing an electronic bookmark marker to enable a return of a user to a desired location in said text.

26. The electronic book machine of claim 1 wherein said database has a memory area storing a graphic representation or animation, further comprising animation means operatively connected to said memory area of said database and said display for displaying said graphic representation or animation on the display.

27. The electronic book machine of claim 26 wherein said text is provided with an icon marking a place for display of said graphic representation or animation, further comprising user operated animation selection means operatively connected to said scrolling means for selecting said icon from text on said display; said animation means being operatively connected to said animation selection means for displaying said graphic representation or animation on the display in response to a selection made by a user via said animation selection means.

28. The electronic book machine of claim 1, further comprising gauge means operatively connected to said scrolling means and to said display for providing, on said display, a progress gauge indicating a location of text on said display relative to the entire text of said prose work.

29. The electronic book machine of claim 28 wherein said gauge means includes means for identifying a chapter shown on said display and for indicating the number of remaining chapters in said prose work.

30. The electronic book machine of claim 28 wherein said progress gauge is a variable-length bar.

31. The electronic book machine of claim 1, further comprising operator actuated prior screen return means operatively connected to said scrolling means and said display for interrupting the scrolling of text on said display, showing text of a prior screen on said display and continuing scrolling of said text beginning with said prior screen.

32. The electronic book machine of claim 1, further comprising operator actuated scroll adjustment means operatively connected to said scrolling means for adjusting a rate of scroll of said text on the display.

33. The electronic book machine of claim 32 wherein said scrolling means include pause means for temporarily and automatically halting the scrolling of said text on said display in response to markers contained in said text.

34. The electronic book machine of claim 1 wherein said scrolling means comprises for automatically scrolling said text on the display, independently of any operator input to the platform.

35. A hand held electronic book machine having a platform with a keyboard and a display for displaying text, comprising:

a database mounted to the platform and storing text of a prose work;

scrolling means operatively connected to said database and to the display for automatically scrolling said text on the display at a substantially uniform rate, independently of any operator input to the platform; and operator actuated scroll adjustment means operatively connected to said scrolling means for adjusting a rate of scrolling of said text on the display, said scrolling means including pause means for temporarily and automatically halting the scrolling of said text on said display in response to markers contained in said text and for subsequently automatically recommencing scrolling of said text on said display at said substantially uniform rate.

36. The electronic book machine of claim 35 wherein said pause means includes means for providing pauses of different durations in response to different kinds of said markers, said kinds of said markers including commas, periods and paragraph changes.

37. A hand held electronic book machine having a platform with a keyboard and a display for displaying text, comprising:

a database operatively connected to the platform and storing text of the prose work and at least one graphic representation or animation;

scrolling means operatively connected to said database and to the display for scrolling said text on the display;

animation means operatively connected to said database and said display for displaying said graphic representation or animation on the display; and delay means operatively connected to said scrolling means and said operator actuated animation selection means for temporarily interrupting the scrolling of said text during display of said graphic representation or animation.

38. The electronic book machine of claim 37 wherein said text includes an icon marking a place in said text for display of said graphic representation or animation, further comprising user operated animation selection means operatively connected to said scrolling means for selecting said icon from text on said display, said animation means being operatively connected to said animation selection means for displaying said graphic representation or animation on the display in response to a selection made by a user via said animation selection means.

39. The electronic book machine of claim 37 wherein said animation means is operatively connected to said database and said display for displaying said graphic representation or animation automatically at a predetermined position in said text.

40. A method for operating a hand held electronic book machine having a platform with a keyboard and a display for displaying text, comprising:

providing a database operatively connected to the platform and storing text of the prose work in a first memory portion and predetermined information in a second memory portion;

accessing said first memory portion;

upon accessing said first memory portion, automatically scrolling said text on the display;

after scrolling of said text on the display, accessing said second memory portion to select a portion of said predetermined information in said second memory portion;

after accessing said second memory portion, displaying the selected portion of said predetermined information on the display; and temporarily interrupting the scrolling of said text during display of the selected portion of said predetermined information.

41. The method of claim 40 wherein said predetermined information includes at least one of (1) glossary entries for selected words in said text, (2) summaries of different portions of said text, and (3) resumés of characters in said text.

42. The method of claim 41 wherein said database includes a memory area storing a standard reference work in electronically encoded form, further comprising selecting, from said memory area, part of said reference work to be displayed on said display in place of said text, temporarily interrupting the scrolling of said text, and displaying the selected part of said reference work on said display during the scrolling interruption.

43. The method of claim 41, further comprising the step of storing an electronic bookmark marker to enable a return of a user to a desired location in said text.

44. The method of claim 41 wherein said database has a memory area storing a graphic representation or animation, further comprising:

displaying said graphic representation or animation on the display; and temporarily interrupting the scrolling of said text during display of said graphic representation or animation.

45. The method of claim 44 wherein said text is provided with an icon marking a place for display of said graphic representation or animation, also comprising selecting said icon from text on said display, the displaying of said graphic representation or animation being implemented in response to selecting of said icon.

46. The method of claim 41, further comprising providing, on said display, a progress gauge indicating a location of text on said display relative to the entire text of said prose work.

47. The method of claim 46 wherein said progress gauge includes a chapter identification and a number of remaining chapters in said prose work.

48. The method of claim 41 wherein said progress gauge is a variable-length bar.

49. The method of claim 41, further comprising interrupting the scrolling of text on said display in response to a pressing of a key on said platform, showing text of a prior screen on said display and continuing scrolling of said text beginning with said prior screen.

50. The method of claim 40 wherein the accessing of said second memory portion to select said portion of said predetermined information includes automatically selecting a first term in text on said display for which there is an entry in said second memory portion and displaying the entry for said first term.

51. The method of claim 40 wherein the accessing of said second memory portion to select said portion of said predetermined information includes selecting a portion of said predetermined information relevant to a term at any position in text on said display.

52. The method of claim 40 wherein the accessing of said second memory portion to select said portion of said predetermined information said selection means includes selecting, via an electronic menu, a portion of said predetermined information in said second memory portion for display.

53. A hand held electronic book machine having a platform with a keyboard and a display for displaying text, comprising:

a database mounted to the platform and storing text of a prose work;

scrolling means operatively connected to said database and to the display for automatically scrolling said text on the display, independently of any operator input to the platform; and operator actuated scroll adjustment means operatively connected to said scrolling means for adjusting a rate of scrolling of said text on the display, said scrolling means including pause means for temporarily and automatically halting the scrolling of said text on said display in response to markers contained in said text, said pause means including means for providing pauses of different durations in response to different kinds of said markers, said kinds of said markers including commas, periods and paragraph changes.

* * * * *